UNITED STATES PATENT OFFICE.

ALCIDE FRANCOIS POIRRIER, OF PARIS, FRANCE, ASSIGNOR TO SOCIÉTÉ ANONYME DES MATIERES COLORANTES ET PRODUITS CHIMIQUES DE ST. DENIS, OF PARIS, FRANCE.

PROCESS OF MAKING BLACK SULFUR DYES.

No. 904,224.    Specification of Letters Patent.    Patented Nov. 17, 1908.

Application filed November 6, 1907. Serial No. 400,991.

*To all whom it may concern:*

Be it known that I, ALCIDE FRANCOIS POIRRIER, a citizen of the Republic of France, residing at Paris, France, have invented a new and useful Improvement in Processes of Making Black Sulfur Dyes, which invention is fully set forth in the following specification.

It is known that when dinitrophenol is fused with sodium polysulfid there is obtained a black sulfurized dyestuff, and as best proportions of the ingredients there has been recommended the use of 5 parts of crystallized sodium sulfid and 2 parts of sulfur to 1 part of dinitrophenol.

More recently it has been proposed to substitute for the fusion with polysulfid, a prolonged (25 hours) ebullition with a solution of polysulfid, the proportions being somewhat different from those mentioned above.

In the fusion process the mass is directly soluble in water; in the other process the dyestuff remains dissolved in the medium in which it is formed; in both cases the product of the reaction, the dyestuff, is soluble or remains dissolved in the water together with the polysulfid. It is, however, almost impossible to use industrially a dyestuff containing sodium polysulfid and in order to avoid the presence of this material it has been proposed to add at the end of the boiling operation, sodium sulfite which converts the excess of sodium polysulfid into the form of monosulfid.

Equally for the purpose of eliminating polysulfid, the isolation of the dyestuff has been recommended, by precipitating it either by adding an acid or by blowing in air; whichever mode of precipitation is adopted, however, the isolated dyestuff is always accompanied by sulfur derived from the destruction of the polysulfid.

The present invention relates to a manufacture of the dyestuff whereby it is possible to obtain it in a very concentrated form and completely free from polysulfid. For this purpose sodium dinitrophenol is heated with an aqueous solution of a sodium polysulfid of such composition that the dyestuff, as it is formed, separates in a state insoluble in the medium wherein it is produced. Thus it is only necessary to filter directly the product of the reaction and to wash the solid matter with water, in order to obtain a dyestuff of high coloring power and free from excess of the reacting substances.

The procedure according to the invention has much to recommend it from the technical point of view, for apart from the fact that an insoluble product is obtained at once, there is the advantage that a smaller proportion of the reagents is consumed and the duration of the process is considerably reduced.

The operation may be conducted in the following manner:—33.5 kilos of sodium dinitrophenol, that is to say the quantity corresponding with 30 kilos of dinitrophenol, are dissolved in 80 liters of water. This solution is heated to ebullition and there is introduced in small doses a solution of sodium polysulfid made from 40 liters of water, 40 kilos of sodium sulfid of 62 per cent. strength, and 30 kilos of sulfur. The mixture is kept boiling, the temperature being raised, if necessary, by addition of an alkali salt such as a chlorid or a sulfate, so that it is 106°–108° C. After 10–15 hours the formation of dyestuff is complete; the mass is diluted with water, filtered and the dyestuff washed with water. When dry, the dyestuff is a black powder insoluble in water, alcohol and sulfuric acid, even when the latter contains 30 per cent. of sulfuric anhydrid; it dissolves in solutions of sodium sulfid to a dark blue solution, which dyes cotton directly bluish black, full and very fast shades.

Having thus described the nature of my said invention and the best means I know of carrying the same into practical effect, I claim:—

The herein described process of making a black sulfurized dyestuff, consisting in heating binitrophenate of sodium in an aqueous saline medium to a temperature of 106–108° C., with polysulfid of sodium of a definite composition and in such proportion that the dyestuff as it is formed separates in a state insoluble in the medium.

In witness whereof I have hereunto signed my name this 29th day of October 1907, in the presence of two subscribing witnesses.

ALCIDE FRANCOIS POIRRIER.

Witnesses:
  DEAN B. MASON,
  JULES ARMENGAUD, Jeune.